(12) United States Patent
Schudt et al.

(10) Patent No.: US 6,220,300 B1
(45) Date of Patent: Apr. 24, 2001

(54) MODULE, ESPECIALLY A MODULE FOR AN ELECTROHYDRAULIC TRANSMISSION CONTROLLING DEVICE

(75) Inventors: Klaus Schudt, Nordheim (DE); Jim Beakley, West Bloomfield Township, MI (US); Jeff Brownlee, Fowlerville, MI (US); John Casari, Manchester, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/395,244

(22) Filed: Sep. 13, 1999

(30) Foreign Application Priority Data

Sep. 16, 1998 (DE) .............................. 198 42 333

(51) Int. Cl.⁷ .................................... F16K 11/10
(52) U.S. Cl. ...................... 137/884; 251/129.15
(58) Field of Search ................ 131/884; 251/129.15

(56) References Cited

U.S. PATENT DOCUMENTS

| | | | | |
|---|---|---|---|---|
| 5,466,055 | * | 11/1995 | Schmitt et al. | 303/119.2 |
| 5,474,108 | * | 12/1995 | Inden et al. | 137/884 |
| 5,692,813 | * | 12/1997 | Vellmer | 303/119.2 |

FOREIGN PATENT DOCUMENTS

| | | |
|---|---|---|
| 196 01 202 A1 | 3/1997 | (DE) . |
| 196 40 261 A1 | 4/1998 | (DE) . |
| 196 45 522 A1 | 5/1998 | (DE) . |
| 197 08 210 A1 | 9/1998 | (DE) . |
| 694 10 202 T2 | 9/1998 | (DE) . |
| 692 26 397 T2 | 12/1998 | (DE) . |
| 695 06 740 T2 | 5/1999 | (DE) . |

\* cited by examiner

Primary Examiner—John Fox
(74) Attorney, Agent, or Firm—Michael J. Striker

(57) ABSTRACT

The module for an electrohydraulic transmission controlling device includes a plurality of magnetic valves (16,17) arranged in a housing (12). The housing (12) includes a control block (24) and a cover (22) for the control block (24). The cover (22) is made by a MID casting method and the control block (24) is made by a thixotropic casting process. Component groups (14), especially a resistor (18), a switch (20) and magnetic valves, are arranged in the housing (12). By making the cover in a MID casting method and the control block by a thixotropic casting process the manufacture of the module is more economical and the assembly is simplified.

11 Claims, 6 Drawing Sheets

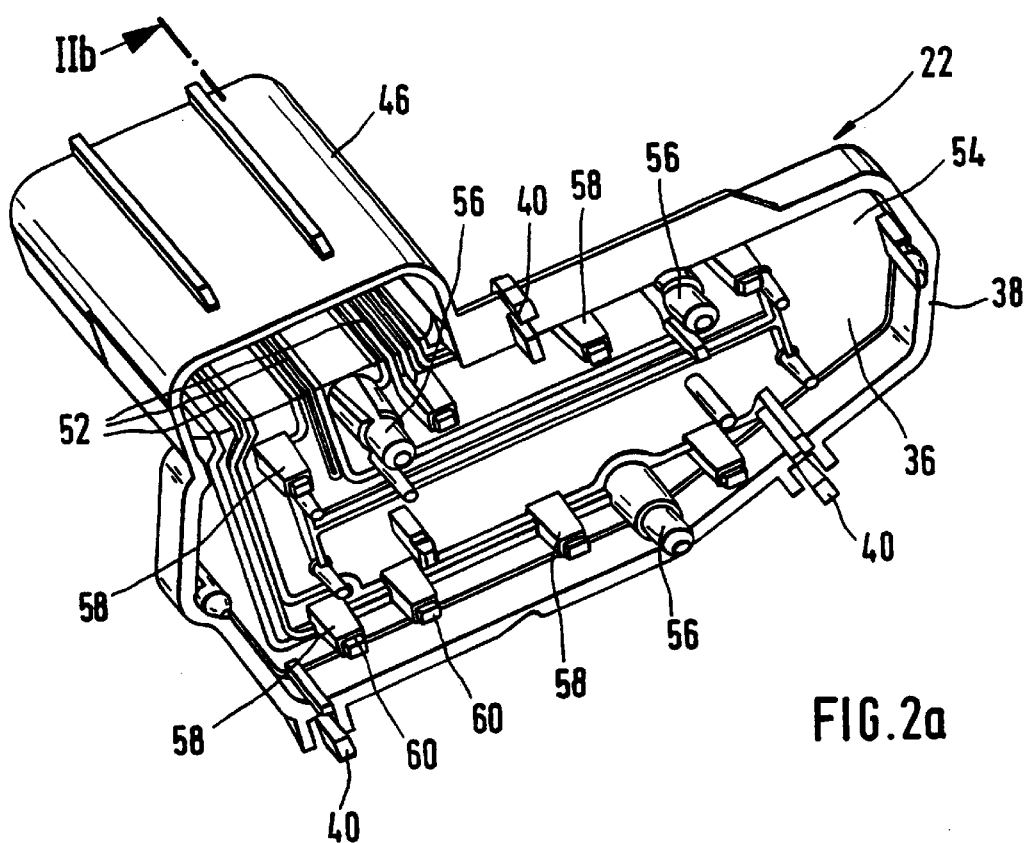
FIG.2a
FIG.2b
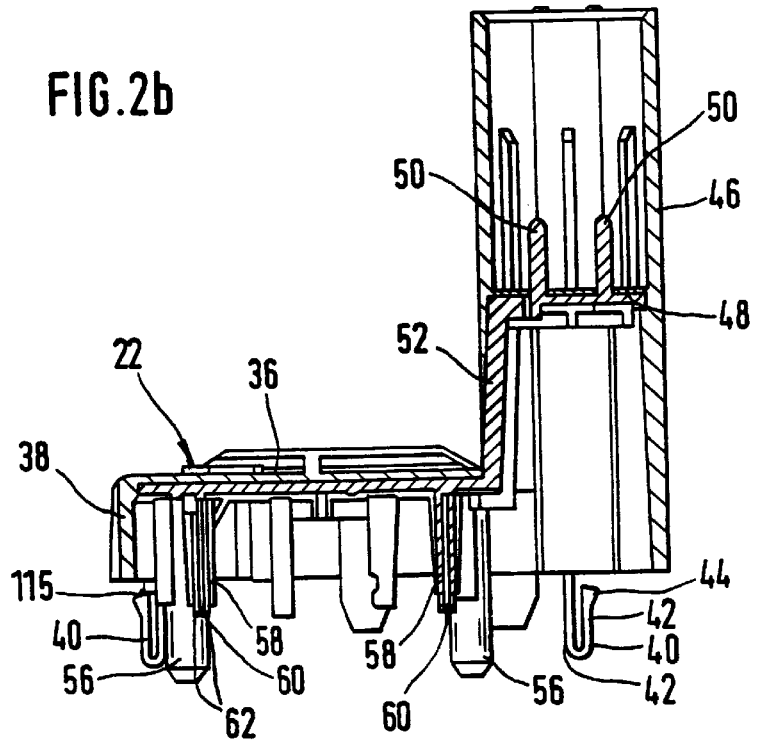

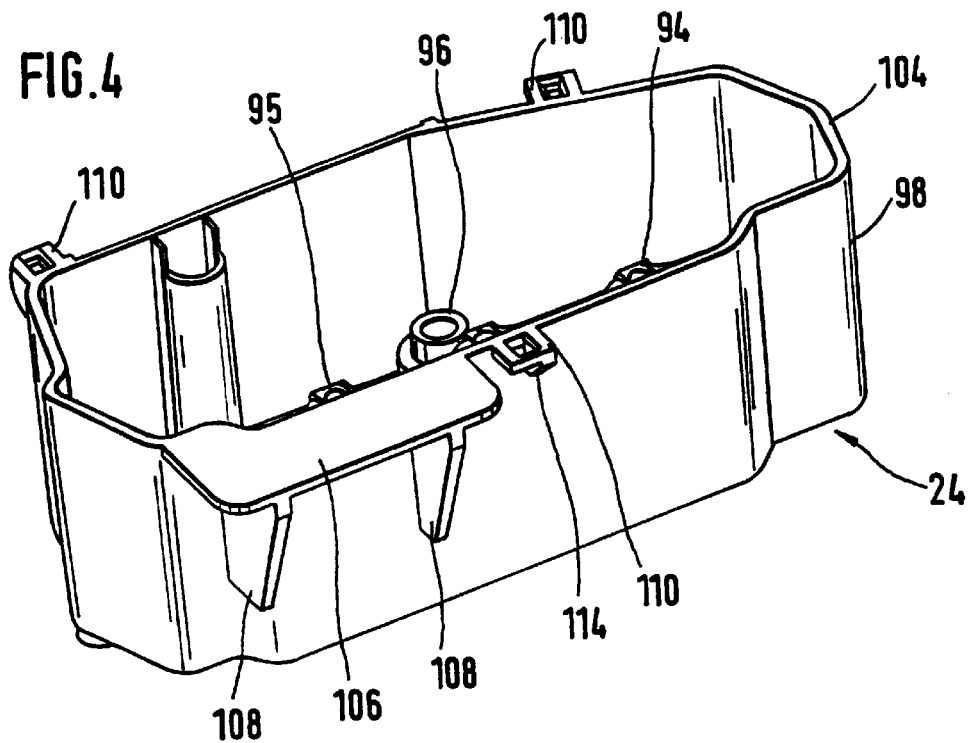
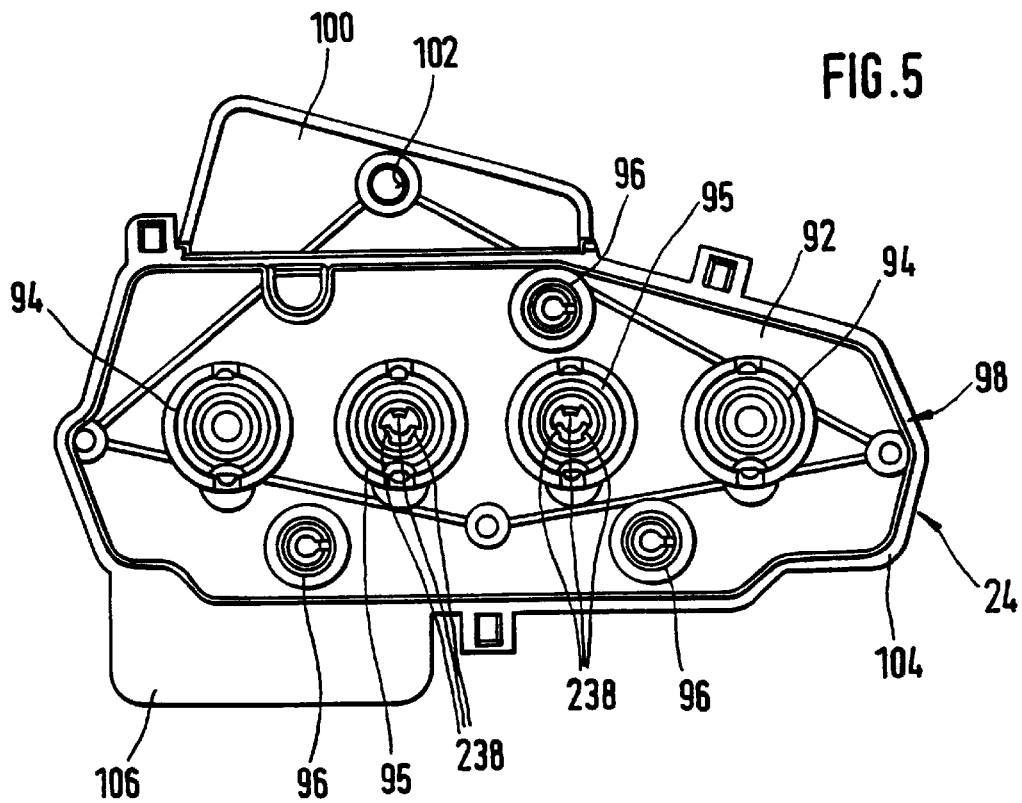

MODULE, ESPECIALLY A MODULE FOR AN ELECTROHYDRAULIC TRANSMISSION CONTROLLING DEVICE

BACKGROUND OF THE INVENTION

1. Field of the Invention

The present invention relates to a module, especially a module for an electrohydraulic hydraulic transmission controlling device.

2. Prior Art

This type of module has a multipart housing in which component groups, especially resistors and magnetic valves, are arranged. The module acts as an interface between the electronic control circuitry and the mechanism. It contains all required component groups and simplifies assembly at the transmission manufacturers, since only one part is to be assembled instead of the individual component groups.

The housing of the module comprises a cover and a control block. A plug is arranged on the cover, at which a controller can be connected. The connection to the component groups, i.e. the magnetic valves and resistors, occurs by a punched grid. The punched grid is either coated by injection molding and/or covered with the cover. The electrical contacting with the other parts takes place in a solder bath, which is an expensive process step. A principal disadvantage of the punched grid is that essentially is formed in only two-dimensions. The structural embodiments are limited in their geometrical form.

The control block is usually made in a conventional die casting process. The valve seat must subsequently be made subsequently in an additional turning or milling operation. The connections for the conductors leading to the magnetic valves are formed through passages, which extend transversely to the axes of the valve seats. Filter elements are built into these transverse passages. Several assembly axes result because of these structural features, which makes the assembly more difficult, since the various parts must be assembled from different directions in the control block. The valve component groups are usually expensive parts that must be manufactured by drilling, turning and milling. The attachment of the magnetic valves in the control block occurs by means of an additional clip, which is secured with screws in the control block.

In total, a commercial module requires many parts and many processing steps for manufacture and assembly.

SUMMARY OF THE INVENTION

It is an object of the present invention to provide a module, especially a module for an electrohydraulic hydraulic transmission controlling device of the above-described type which does not have the above-described disadvantages.

According to one feature of the invention a first housing part is made in a MID molding method (molded interconnect device), whereby it is possible to provide conductor strips, electrical connections and mechanical attachment devices for component parts and a plug for connection of a controller.

The module according to the invention has the advantage that it requires fewer parts and fewer working steps for manufacture and assembly of the parts.

According to another feature of the invention a second housing part is made in a thixotropic casting process, whereby the milling of the seat surfaces in the receptacles can be eliminated.

The assembly of the module is then essentially simplified and thus made more economical when the receptacles are formed in the housing parts so that the component groups can be assembled from only one or from two opposite sides of the housing part. Thus a uniaxial assembly results which is more economical in contrast to an assembly that occurs from several sides, when a locking strap is formed on a first housing part which engages in receptacles formed in the second housing part. In this way additional attaching devices such as screws can be eliminated.

An especially simple connected between the first housing part and the second housing part results when a locking clip is formed on the first housing part which engages in a receptacle or recess provided in the second housing part. In this way additional attaching elements such as screws can be eliminated.

It is particularly advantageous when the first housing part is formed as a cover and the second housing part as a control block.

If resistors are arranged in passages formed in the control block and have a resilient connector which has a conical outer surface in which a conical projection of the cover engages, the resistors are held fixed only by the assembled housing parts. Furthermore this provides some additional tolerance compensation.

Various embodiments for the assembly result when the magnetic valves comprises coil-art groups and valve-part groups. The coil-part groups are attached to the cover and the valve-part groups to the control block. It is particularly advantageous when the coil-part groups are attached to the cover by cut terminal connections. When the valve-part groups are fixed by a form-locking connection in a valve seat that is provided as a stepped passage in the control block, the edges of the passages are wedged about the pole pieces of the valve-part groups in a ring-like manner, which simplifies the assembly.

Additional parts may be dispensed with and the assembly simplified when a cylindrical depression is formed in the pole piece of the magnetic valve, in which a punched valve seat and punched and deep drawn valve cap are arranged. An especially strong hold and a good seal result when the valve seat and the valve cap are fixed by wedging or forcing in the pole piece.

Additional advantages and advantageous features of the module according to the invention are described further in the detailed description hereinbelow and the description.

BRIEF DESCRIPTION OF THE DRAWING

The objects, features and advantages of the invention will now be illustrated in more detail with the aid of the following description of the preferred embodiments, with reference to the accompanying figures in which:

FIG. 2a is an exploded perspective view of a cover;

FIG. 2b is a cross-sectional view taken through the cover of FIG. 2a along the section line IIb—IIb;

FIG. 4 is a perspective view of a control block for the module according to the invention;

FIG. 5 is a plan view of the control block according to FIG. 4;

DESCRIPTION OF THE PREFERRED EMBODIMENTS

Figure 1:
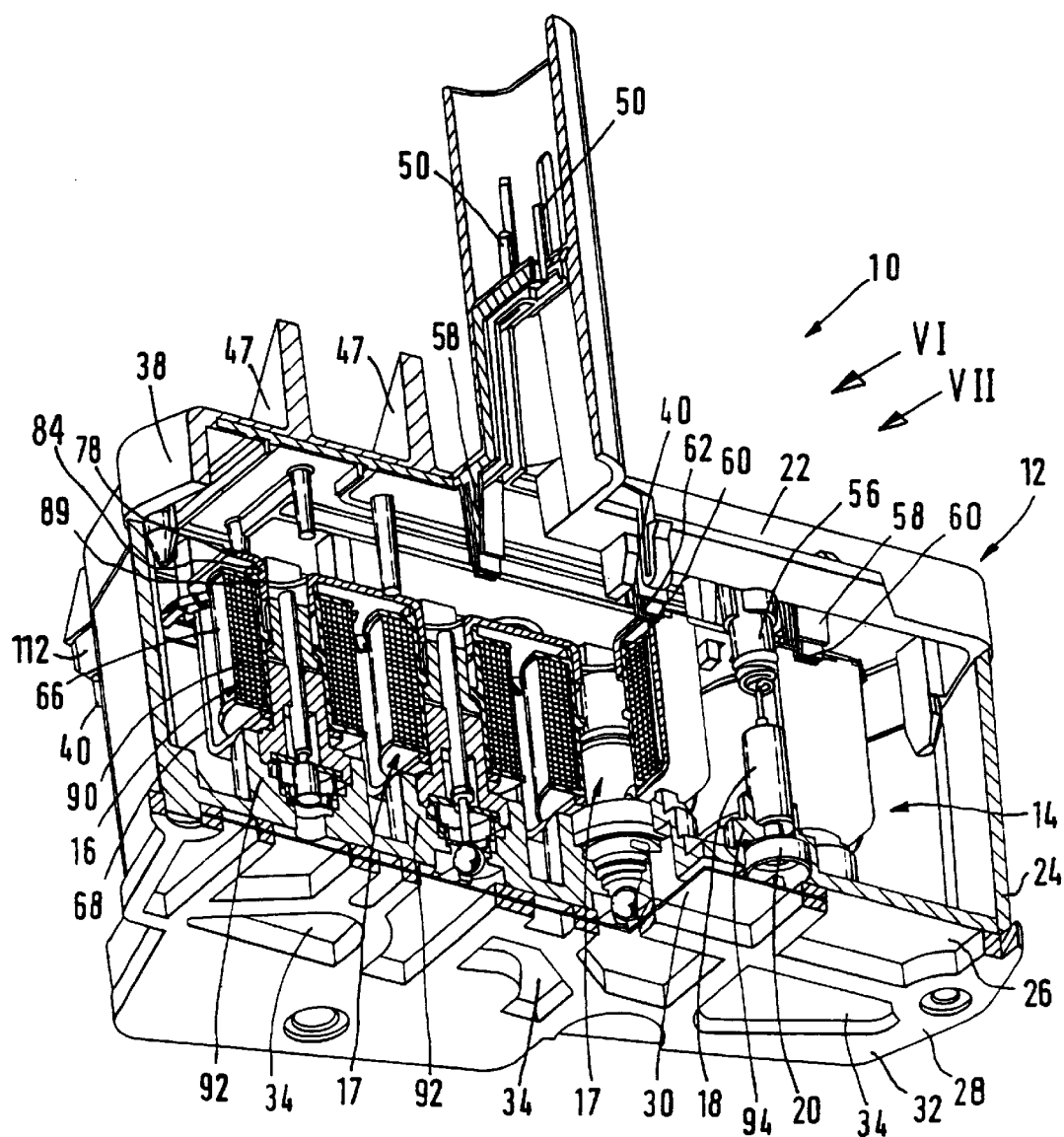
FIG. 1 is a cutaway perspective view of one embodiment of a module according to the invention.

A module 10 for an electrohydraulic transmission controlling device is shown in FIG. 1. The module 10 has a multipart housing 12 in which the component group 14 is arranged. The component group 14 advantageously comprises resistor 18, a switch 20, magnetic valves 16, which are open without current, and magnetic valves 17, which are closed without current. These magnetic valves are especially designed for use in a module for an electrohydraulic transmission controlling device and are formed as 3/2 way valves. Two magnetic valves 16, which are open without current flowing through them, two magnetic valves 17, which are closed without current flowing through them, three resistors 18 and three switches 20 are shown in the drawing. More or less of these individual parts may be included in other embodiments of the module. The housing 12 includes at least two housing parts. In this embodiment at least a first housing part is formed as a cover 22 and at least a second housing part is formed as a control block 24.

A filter plate 28 is attached to a mounting surface 26 of the control block 24. The filter plate 28 comprises a filter mesh 30 around which a distributor plate 32, which has a plurality of throughgoing holes 34 is arranged. The throughgoing holes 34 are connected with passages in the control block 24 and permit connection of different ducts to the connectors of the magnetic valves 16,17.

The filter plate 28 is manufactured in a so-called thixotropic casting process or Thixomolding® process. In that process processing of metallic materials, especially magnesium, is indicated in a die-casting machine. In addition an alloy granulate is heated in a controlled manner in a rotating screw conveyor so that a plastic mass comprising a thixotropic mass of solid and liquid phases is formed. The metal that is plasticized in this way is extruded into the molds within milliseconds under high pressure. The advantage of this casting method in comparison to existing commercial casting methods is that no subsequent working of the seat surfaces is required, since the surface quality is very good. For this reason no additional seals are required in the filter plate 28. Thus the thioxotropic casting method is very advantageous for manufacture of the filter plate 28 for the module 10. Alternatively the filter plate 28 of course can be a filter mesh 30 which is extruded from plastic. Seals made of silicone or rubber can also be provided.

The cover 22 of the housing 12 is shown in FIGS. 2a and 2b. The cover 22 has a plate-like part 36 with a peripheral edge from which a wall 38 extends in the direction of the control block 24. Three locking clips 40 are formed on the wall 38 of the cover 22. Each locking clip 40 comprises two clip halves 42 that are parallel to each other and to the wall 38. A first clip half 42 is formed with one end at the wall 38. The other end is connected by a 180° bend with the second clip halve 42. The end of the second clip halve 42 has an enlarged portion 44 so that a secure connection of the cover 22 to the control block 24 is possible.

A pipe-like socket member 46 is cast on a lateral edge of the cover 22 and is perpendicular to the plate-like cover piece 36. The one end of the socket member is connected flush with the wall 38. The other end projects beyond the plate-like cover piece 36. Two ribs 47 (FIG. 1) are formed between the plate-like cover piece 36 and the socket member 46 for mechanical reinforcement. A plate-like insert piece 48 arranged approximately parallel to the plate-like cover piece 36 is provided in the socket member 46. Socket contacts 50 pointing away from the housing 12 are formed on the plate-like insert piece 48. Conductor strips 52 extend from the respective socket contacts 50 along the plate-like insert piece 48, also at right angles thereto along the interior side of the socket member 46 and then again along the inner side 54 of the plate-like cover piece 36 of the cover 22. The conductor strips 52 are preferably three-dimensional structures on the cover 22, so that the cover 22 has a complex structure. The interior side 54 of the cover piece 36 means that side which is inside when the cover 22 is assembled together with the housing 12.

Individual conductor strips 52 extend on the interior side 54 to respective tapering or conical protruding elements 56. The conical protruding elements 56 of the cover 22 act to fix and contact respective resistors 18. The conical protruding elements 56 are provided with a metallic coating that is connected with the conductor strips 52. Conductor strips 52 also connect to eight protruding elements 58 grouped in two parallel rows of four respective protruding elements. In one row the protruding elements 58 are equally spaced from each other while in the other row three protruding elements 58 are equally spaced from each other and a fourth protruding element 58 has a smaller spacing from the others. The ends 60 of the protruding elements 58 are formed so that a terminal cut connection with a wire is possible. At least two cuts 62 extending inclined with respect to each other are provided on the ends 60. The cuts 62 similarly are metallized and are connected to the conductor strips 52. The protruding elements 56,58 are devices for electrical connection and for mechanical attachment of the part group 14. The mechanical attachment is obtained by means of a form-fitting connection that requires no additional attaching devices or parts, such as screws and plugs. The cover 22 is, as shown in FIG. 1, formed so that the part group 14 can be arranged on the interior side 54, which means on one side of the cover 22. An economical uniaxial assembly is possible in this way.

The cover 22 (second housing part) is made in a so-called MID casting process. The MID (Molded Interconnect Devices) casting process means three-dimensional injection cast conductor supports. Products are made from thermoplastics in this process, which are provided with partially or completely metallized surfaces. One of the most frequently employed manufacturing processes for MID is the two-component injection casting method with subsequent wet chemical metallization of plastic components. A connecting body is made from two thermoplastic parts, of which one is metallizable while the other components remains completely uneffected by the chemical action of the metallized electrolytes. MID broadens or extends the conventional circuit board engineering techniques which are limited to a plane. The great advantage of MID is the large degree of geometric freedom which permits, as already described, the three-dimensional structure of the conductor strips 52, the reduction in material costs and above all the reduced number of manufacturing steps, by which additional components, such as punched grids, are eliminated. Thus direct application in complex modules 10, such as controllers, is very advantageous.

Figure 3:
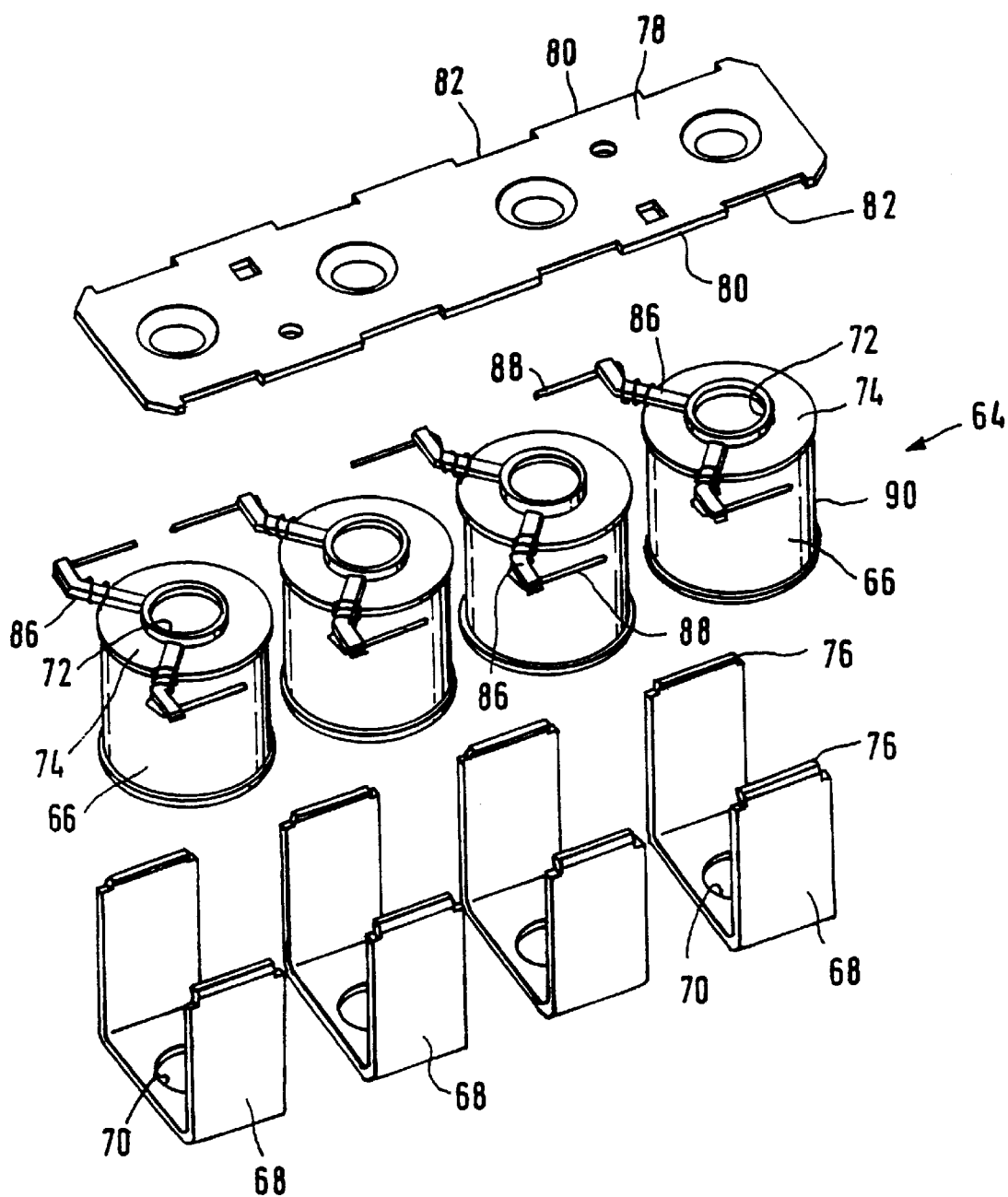
FIG. 3 is an exploded perspective view of a modular coil part group.

A coil-part group 64 of the gear unit magnetic valves 16, 17 in the form of a coil module is shown in an exploded perspective view in FIG. 3. The coil-part group 64 has four coils 66. Each of the four coils is arranged in a U-shaped flux bracket 68. A hole 70 is provided centrally in the crosspiece of each flux bracket 68 which is aligned with the passage 72 in the coil body 74 of the coil 66 engaged with it. The ends 76 of both U-members of the flux bracket 68 have the form of snap hooks and are bent so that they engage a flux plate 78 in a form- and force-locking manner, whereby the coils 66 are attachable to the flux plate 78. Instead of forming the ends 76 of the U-shaped flux bracket 68 preferably like snap hooks that engage around the flux plate 78, the flux bracket 68 can be welded or formed to fit together with the flux plate 78 in other ways in other embodiments. The flux plate 78 has a longitudinal extent and is substantially rectangular. In this way the coils 66 and the flux brackets 68 are arranged in a row on the flux plate 78. So that the flux brackets 68 are not longitudinal slidable on the flux plate 78, small recesses 82 are provided in the long sides of the flux plate 78, in which the ends 76 of the flux brackets 68 engage. Four recesses 82 are equally spaced from each other in each long side. As shown in FIG. 1, the flux plate 78 has four protruding ducts 89. The size of the ducts 89 is such that they engage with some play in the throughgoing holes 72 in the coil bodies 74 of respective coils 66. The coils 66 are fixed better in their appropriate position by means of the ducts 89 and provide additional iron in the coils 66, whereby the magnetic properties of the coils are improved.

Each coil 66 has two arms 86 which are V-shaped and arranged transversely to the throughgoing holes 72. The wire ends 88 of the windings 90 of the coils are placed on the respective arms 86. The arms 86 guarantee that the wire ends 88 are fixed in their positions. The wire ends 88 of the coils 66 are oriented so that two rows of aligned wire ends result. The wire ends in one row point in the same direction and are equally spaced from each other. In the other row three of the four wire ends are equally spaced from each other and point in the same direction. The fourth of the four wire ends 88 points in the opposite direction from the other three wires in the other row. The wire ends 88 are aligned like the protruding elements 58 of the cover 22 for assembly of the coil-part group 64. In this way it is guaranteed that the coil-part group 64 has the correct alignment in the cover 22. Thus the possibility of incorrect assembly of the coil-part group is eliminated. The coil-part group 64 is held on the cover 22 by means of the terminal cut connections, which are formed by the cuts 62 on the ends of the protruding elements 58 and the wire ends 88. Because of that a reliable mechanical and electrical connection of the coil-part group 64 with the cover 22 results. Preferably no additional contacting work is required, for example as would be performed by means of a solder bath. The assembly of the modular coil-part group 64 is very simple, since it is assembled as a single structural group.

A more detailed structure for the control block 24 is shown in FIGS. 4 and 5. The control block 24 has a control plate 92 on which the mounting surface 26 for the filter plate 28 is provided. Four receptacles are provided in a row in the control plate 92 in the form of valve seats 94,95 for the magnetic valves 16 and 17. Three receptacles 96 for the resistors 18 are arranged around the four valve seats 94,95. A wall 98 extends peripherally around the control plate 92. The wall 98 of the control block 24 has the same peripheral form as the wall 38 of the cover 22. Generally it is higher. A flange 100 with a passage 102 is formed outside the wall 98 at the same level as the control plate 92. A plate-like part 106 is formed on the upper edge 104 of the wall 98. Two ribs 108 are formed between the wall 98 and the plate-like part 106 for mechanical reinforcement. The plate-like part 106 closes the end of the socket member 46, which faces the control block 24.

Similarly three U-shaped receptacles 110 are formed on the edge 104 of the wall 98 outside of the control block 24. Cavities in the form of rectangular passages 112 are formed in the respective receptacles 110. A reinforcing rib 114 is provided for each receptacle 110 for mechanical reinforcement. The receptacles 110 with their passages 112 are arranged so that the cover 22 is guided with the locking clips 40 engaged in the passages 112 during assembly of the module 10. Both clip halves 42 are pressed together during the guiding of the locking clips through the passages 112 of the receptacles 110, when the enlarged portions are forced against the receptacles 110. When the cover 22 comes into contact with its wall 38 on the edge 104 of the wall 98 of the control block 24, also the enlarged portions 44 are guided into the receptacles 110. The clip halves 42 again spread out from each other because of their curved elastic connection. The cover 22 is attached reliably to the control block 24. The ends of the enlarged portions are inclined so that after guiding the locking clips 40 through the receptacles 110 respective inclined surfaces 115 of the enlarged portions bear on the receptacles 110. Thus the locking clips 40 exert a pressing force so that the cover 22 is pressed on the control block 2. Alternatively it is conceivable that the cover 22 and the control block 24 are connected with each other by a conventional screw connection in other embodiments.

A seal is provided between the cover 22 and the control block 24. The control block 24 is however similarly made in a thixotropic casting method. This casting method has, as already been described, the advantage that no subsequent working of the seat surfaces, such as the upper edge 104 of the wall 98 of the control block 24, is required. Thus on closing the control block 24 with the cover 22 no additional sealing is required. The surface material of the seating surfaces of the valve seat 94,95 is so good that they need not be further worked.

Figure 6:
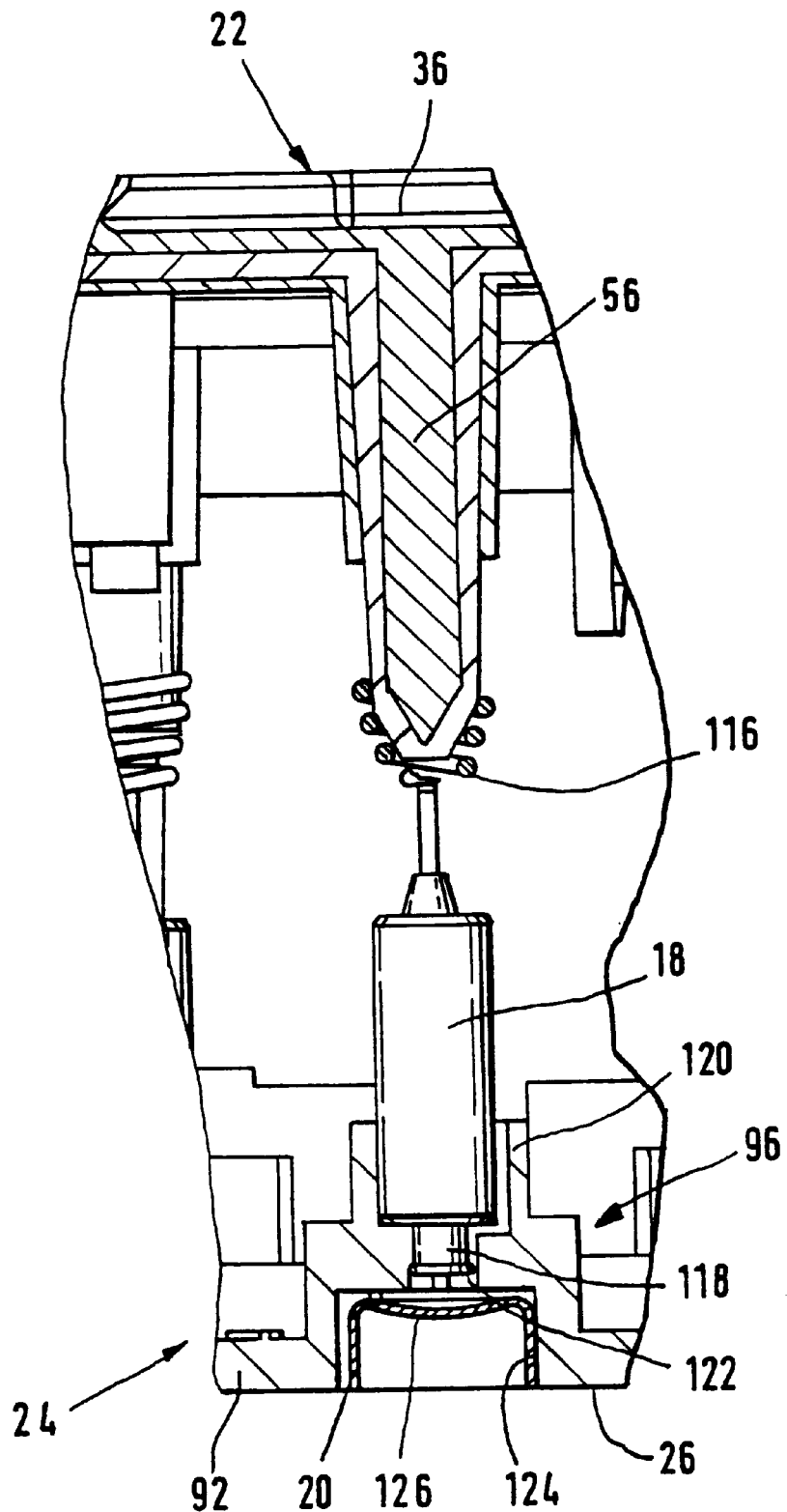
FIG. 6 is a cutaway plan view of the module sown in FIG. 1 in the direction of the arrow VI in FIG. 1 showing a resistor.

A resistor 18 is shown in FIG. 6 as it is arranged in the closed housing 12. The resistor 18 has a cylindrical body and a spring connector 116 on one end. The spring connector 116 circumscribes a conical outer surface. A conical protruding element 56 of the cover 22 presses in the spring connector 116. In this way the resistor 18 is fixed in position by the conical protruding element 56. The resistor 18 is at the same time reliably held in the receptacle 96. Also this arrangement provides some compensation for manufacturing tolerances. The resistor 18 has a contact 118 for the part group 14, in this case the switch 20, arranged outside of the housing on the other end. The resistor 18 is arranged, with the end on which the contract 118 is formed, in a sleeve-like extension 120 of the receptacle 96. The cylindrical contact 118 of the resistor 18 is arranged in a throughgoing passage 122 of the receptacle 96. The throughgoing passage 122 widens into a cylindrical depression 124 that extends from the assembly surface of the control block 24.

The switch 20 is arranged in the cylindrical depression 124, which means outside of the housing 12. The switch 20 is a pot-like part. The bottom 126 of the pot-like switch 20 is arranged on the contact 118 of the resistor 18 and arched away from it. If the oil pressure to which the switch is exposed increases, by a predetermined amount, for example 1 bar, the arched bottom 126 is pressed in the direction of the contact 118 of the resistor 18, until it finally contacts it. The resistor then feeds a signal to a control device because of that. The switch 20 is only secured by means of a press fit in the cylindrical depression 124.

As shown in FIG. 1 the cylindrical depression 124, the valve seats 94,95 and the receptacles 96, the receptacles for the part group 14, are formed in control block 24 so that the part group 14 can be arranged from two opposite sides of the cover 22, whereby an economical uniaxial assembly is possible.

Figure 7:
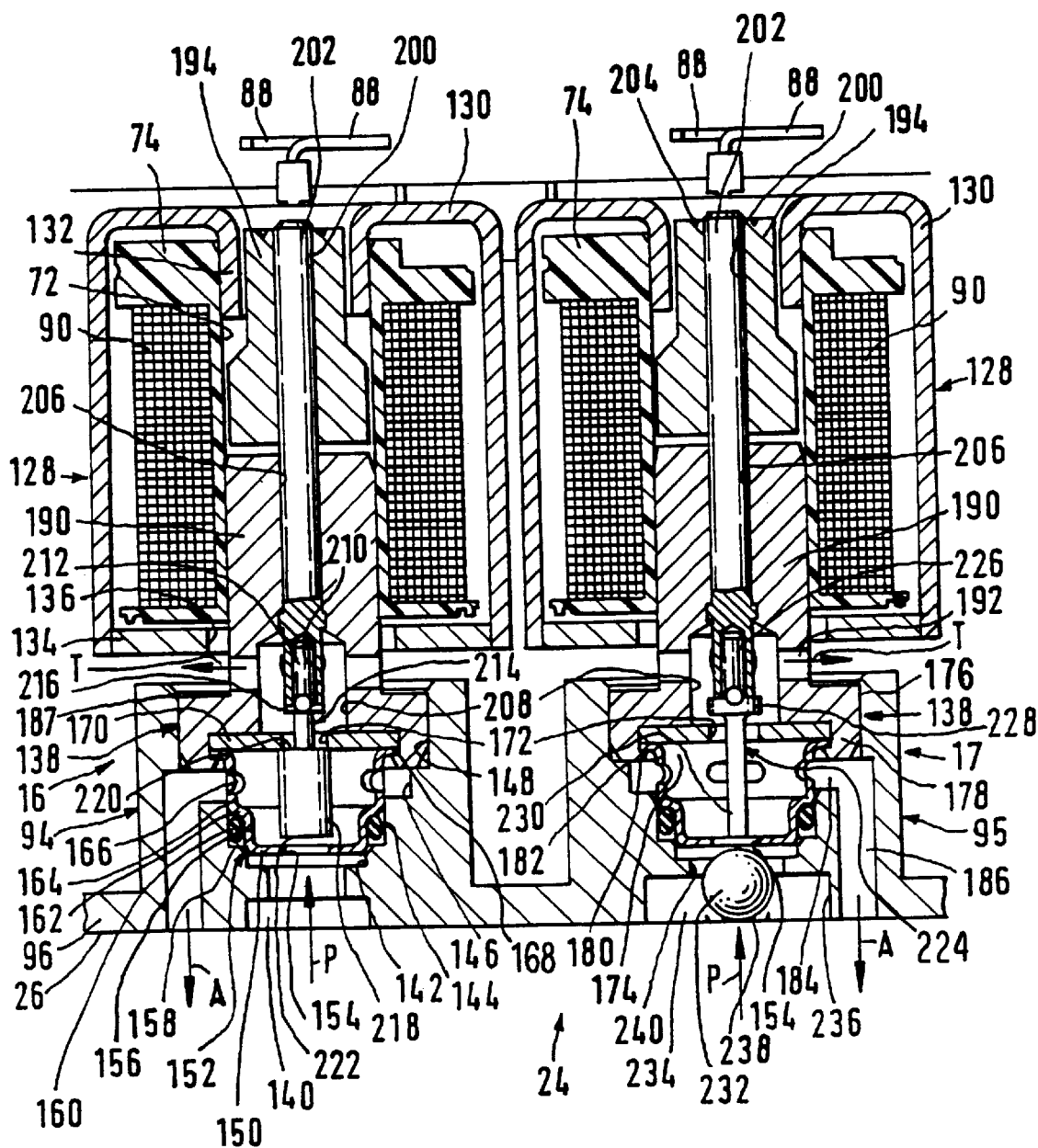
FIG. 7 is a cutaway plan view of the module shown in FIG. 1 in the direction of the arrow VII in FIG. 1, showing two magnetic valves.

A first magnetic valve 16, which is open when no current is supplied to it, and a second magnetic valve 17, which is closed when no current is supplied to it, which have modified coil-part groups 128, are shown in FIG. 7. One coil-part group 128 has a magnetic casing 130, in which a coil body 74 with a winding 90 is arranged. The magnetic casing 130 has a casing passage 132, which engages in the passage 72 of the coil body 74, like the duct 89 of the flux plate 78 of the coil module 64, and fixes it in its radial position. A flux disk 134 provided with a central throughgoing hole 136 is attached to the magnetic casing. The coil-part groups 128 are similarly attachable via wire ends 88 to the protruding elements 58 of the cover 22 by means of the terminal cut connections.

The valve-part groups 138 of the magnetic valves 16,17 are arranged in the respective valve seats 94,95. A stepped passage 140 is provided for the fluid flow from the inlet connector P of the magnetic valve 16 which is open when no current is supplied to it. This stepped passage 140 extends through the mounting surface 26 of the control plate 96 of the control block 24. The valve seat 94,95 is provided with a first, second, third and fourth passage step 142, 144, 146 and 148 in the stepped passage 140 having respective successively increasing diameters.

A base portion 150 of a valve cap 152 of the valve-part group 138 is arranged in the first passage step 142. The base portion 150 of the valve cap 152 has a central hole 154, which is aligned with the stepped passage 140 extending through the control plate 92, which corresponds to the inlet to the inlet connector P of the magnetic valve 16. A sleeve-like section 156 of the valve cap 152, which has the same diameter as the base portion 150, connects to the base portion 150. An O-ring 160 is arranged in a first annular space 158, which is formed by the sleeve-like section 156 and the second passage step 144, for sealing purposes. The annular gap 158 is closed by a disk-shaped shoulder 162 of the valve cap 152, which connects to the sleeve-like section 156, whereby the valve cap 152 has an increased diameter. Another sleeve-like section 164 whose outer diameter is approximately equal to the outer diameter of the shoulder 162 connects to the disk-shaped shoulder 162. Several throughgoing holes 166 are provided in this other sleeve-like section 164. A disk-shaped collar 168 is formed on the sleeve-like section 164. A seat disk 170 of the valve-part group 138 that has the same outer diameter as the collar 168 bears on the disk-shaped collar 168. Further a central hole 172 is formed in the seat disk 170. The seat disk 170 and the disk-shaped collar 168 arranged on it are fixed in a cylindrical depression 174 of a first cylindrical section 176 of a pole piece 178 of the magnetic valve 16. The valve cap extends into the valve seat 94,95 from the cylindrical depression 174.

The disk-shaped collar 168 of the valve cap 152 fits in annular fashion on the outer edge 180 of the cylindrical depression 174 in the pole piece 178 which is formed to fix the seal disk 170 and the valve cap 152 in the pole piece 178. The disk-shaped opposing surface 182 of the first cylindrical section 176 partially contacts on the disk-shaped surfaces between the third passage step 146 and the fourth passage step 148. Thus the third passage step 146, the opposing surface 182 and the sleeve-like section 164 form a second annular space 184. The second annular space 184 corresponds to the consumer connector A of the magnetic valve 16. A passage 186 which opens into the second annular space 184 extends from the mounting surface 26 of the control block 24 and connects perpendicularly to the second annular space 184.

The outer diameter of the first cylindrical section 176 of the pole piece 178 corresponds approximately to the diameter of the fourth passage section 148 of the valve seat 94,95. This diameter is dimensioned so that the pole piece 178 is engaged in a press fit in the valve seat 94,95 or the diameter is dimensioned so that a seat is formed in which the edge 187 of the fourth passage section 148 fits in annular fashion around the first cylindrical section 176 to provide a form-locking connection of the pole piece 178. Thus the valve-part group 138 is fixed in the control block 24 by means of a form-locking connection which is sealed by means of the O-ring. Additional attachment means, for example screws and attaching clips, are therefore unnecessary and are eliminated. The length of the first cylindrical section 176 is ideally dimensioned somewhat less than the depth of the fourth passage step 148.

A second cylindrical section 190 of reduced diameter connects to the first cylindrical section 176 of the pole piece 178. This second cylindrical section 190 extends into the passage 72 of the coil body 74, whereby a disk seat is provided. The second cylindrical section 190 and the annular surface around the fourth passage section 148 of the valve seat 94,95 are spaced so that an annular gap is formed. At least one transverse passage 192 is formed in the second cylindrical section 190 in the vicinity of this annular gap. This transverse passage 192 opens into the housing 12 and forms the return connector T of the magnetic valve 16. An opening is provided in the housing 12 at a suitable position, which connects with the filter plate 28. The position is selected so that the housing 12 is filled or approximately filled with pressurized medium in operation.

The armature 194 of the magnetic valve 16 connects to the second cylindrical section 190 of the pole piece 178 in the passage 72 of the coil body 74. In FIG. 7 a small gap, the so-called pole surface gap, is formed between pole piece 178 and the armature 194. The armature 194 has a first portion, whose outer diameter is somewhat less than the inner diameter of the passage 72. A second potion that extends into the protruding duct 132 of the magnetic casing 130 is connected to the first portion. The armature 194 has a passage 200 through which a pin or shaft 202 passes. A connection 204 is formed on the front end of the armature 194 so that the pin 202 is fixed in the armature 194.

The pin 202 extends through a first passage section 206 of the pole piece 178 and is longitudinally slidable in this first passage section 206. The pin 202 projects into a second passage section 208 of the pole piece 178. The second passage section 208 connects to the first passage section and is in the vicinity of the transverse passage 192. A cylindrical depression 174 in which the seat disk 170 is arranged connects to the end of the second passage section 208.

A blind hole 210 is formed in the end of the pin 202, which extends into the second passage section 208. A first cylindrical section 212 of a first pin insert 214 is arranged in the blind hole 210. A collar 216 is formed around the first cylindrical section 212 of the first pin insert 214. The collar 216 bears on the opposing end of the pin 202. The first pin insert 214 positions itself in the pin 202 because of that. The first pin insert 214 is securely connected with the pin 202 by connection of the collar 216. It is also possible to fix the first pin insert 214 by means of a press fit of the first cylindrical section 212.

The first cylindrical section 212 of the first pin insert 214, whose diameter is less than that of the central hole 172 through the seat disk 170, extends through the central hole 172 of the seat disk 170 and widens into a second cylindrical section 218. The diameter of the second cylindrical section 218 is larger than the diameter of the central hole 172 and central hole 154. An annular surface 220 formed by first cylindrical section 212 and by second cylindrical section 218 can bear in a sealing manner on the edge of the passage 172. The length of the second cylindrical section 218 is less than the depth of the valve cap 152 or the spacing between the base portion 150 of the valve cap 152 and the seat disk 170. When the annular surface 220 contacts on the seat disk 170, the central hole 154 of the valve cap 152 is open. In this way a connection for pressurized fluid exists between the inlet connector P of the magnetic valve 16 and the consumer connector A, which corresponds to the first position of the magnetic valve 16. The opposing surface 222 of the first pin insert 214 contacts in a sealing contact on the annular surface around the central hole 154 of the valve cap 152 by operation of the armature 194 and the pin 202. Because of that pressurized medium can flow from the consumer connector of the magnetic valve through the passage 172 of the seat disk 170 to the return connector T of the magnetic valve 16. The second cylindrical section 218 is dimensioned so that the central hole 172 in the seat disk 170 or the central hole of the valve cap 152 are alternately closed. The pin insert 214 is forced with its annular surface 220 against the central hole 172 of the seat disk 170 in the currentless state and with pressurized medium acting through the inlet connector P. For that reason the inlet connector P is connected with the consumer connector A. The pin insert 214 is arranged between the seat disk 170 and the valve cap 152 in such a way that the consumer connector A is alternately connectable to the inlet connector P and the retun connector T of the magnetic valve 16 by the seat disk 170, the valve cap 152 and the pin insert 214.

The magnetic valve 17 that is closed in the currentless state has essentially the same parts as the magnetic valve 16 which is open in the currentless state. It has a second pin insert 224, which differs from the first pin insert 214 of the magnetic valve 16. The second pin insert 224 has a first cylindrical section 226, which is likewise arranged in a blind hole 210 of the pin 202. A second cylindrical section 228 connects to the first cylindrical section 226. The second cylindrical section 228 bears on the opposing surface of the pin 202 and is connected there so that the second pin insert 224 is fixed with the pin 202. A connection of the pin 202 in a press fit with the pin insert 224 is however also possible. The diameter of the second cylindrical section 228 is larger than that of the central hole 172 of the seat disk 170. During an appropriate operation of the magnetic valve the central hole 172 of the seat disk 170 is closed by the arrangement of the second cylindrical section 228 in the passage 208 of the pole piece 178. In the currentless state and during suitable action of the pressurized medium through the consumer connector A the second cylindrical section 228 is released, whereby pressurized medium can flow from the consumer connector A to the return connector T.

A third cylindrical section 230 whose diameter is less than the diameter of the central hole 172 or the central hole 154 of the valve cap 152 connects to the second cylindrical section 228 and corresponds to the diameter of the first cylindrical section 226. A ball 232 which is arranged outside of the valve cap 152 acts on the opposing surface of the third cylindrical section 230 during operation of the magnetic valve 17, whereby pressurized medium can flow from the inlet connector P through the central hole 154 of the valve cap 152. The length of the second pin insert 224 is also dimensioned so that it can cooperate with the ball 232. When the magnetic valve 17 is in the currentless state and the pressurized medium flows in the ball 232 presses on the edge of the central hole 154 of the valve cap 152 and closes it. The consumer connector A and the return connector T of the magnetic valve 17 are however connected with each other. The pin insert 224 is arranged between the seat disk 170 and the valve cap 152 so that the consumer connector A is alternately connectable with the inlet connector P and the return connector T of the magnetic valve 16 by the seat disk 170, the valve cap 152 and the pin insert 214.

The ball 232 is arranged in a stepped passage 234, which extends from the mounting surface 26. In the first section 236 of the stepped passage 234 three radially protruding elements 238 are provided, whereby the ball 232 is held in the stepped passage 234 (FIG. 5). A second section 240 of the stepped passage 234 provided with a smaller diameter is formed between the first section 236 and the first passage portion 142. This second section 240 guides the ball 234 radially somewhat during axial motion.

During assembly of the magnetic valve 16 that is open in the currentless state first the pin insert 214 is fixed in the pin 202. This fixing can occur by a connection or also by means of a press fit of the pin insert 214 in the pin 202. The seat disk 170 is placed in the pole piece 178 in the cylindrical depression 174. After that the pin 202 is fit in the passage 206. After that the valve cap 152 is placed on the seat disk 170 in the cylindrical depression 174. The seat disk 170 and the valve cap 152 are fixed in the pole piece 178 by connection with the edge 180 of the cylindrical depression. Finally the armature 194 is placed on the pin 202 and positioned so that the correct displacement is set. Finally the armature is fixed by a connection 204.

To assembly the valve-part group 138 the O-ring is connected on the first edge 156 of the valve cap 152. This part group is then put in the valve seat 94,95. By connection with the edge 187 of the passage section or step 148 the valve-part group 138 is subsequently fixed in position.

During assembly of the valve-part group 138 of the magnetic valve 17 that is closed in the currentless state the pin 202 is first connected with the assembled pin insert 224 in the passage 206 of the pole piece 178. Next the seat disk 172 and the valve cap 152 are arranged and attached in the cylindrical depression. Next the ball 232 is placed in the protruding element 238 of the stepped passage 234. Then the valve-part group 138 is connected together with the mounted O-ring 160 in the valve seat 95.

The magnetic valve 16 that is open in the currentless state and the magnetic valve that is closed in the currentless state differ only by a few simple rotary parts, whereby an economical structural housing system is produced in a simple manner. The seat disk 170 is punched or stamped and the valve cap 152 is similarly punched or stamped and subsequently deep-drawn. The magnetic valves 16,17 are ideal for use in a module 10. The inlet connector P and the consumer connector A are acted on through the passages 140, 186 and 234, which are formed in the control block 24. The return connector T leads to the interior of the housing 12. The magnetic valve 16,17 can thus be constructed in a simple manner. The assembly of the magnetic valves 16,17 in the module 10 requires no additional parts for assembly. The valve-part group 138 is connected in the control block 24, whereby the seal between the return connector T and the consumer connector A is formed. An O-ring can thus be eliminated. By the separation of the valve-part group 138 and the coil-part groups 64, 128, connections between both these groups can be eliminated. Also the coil-part groups 64,128 require no additional attachment means for the cover 22.

Iron particles cannot be forced between the pole piece 178 and the armature 194. The adjustable positioning of the pin 202 in the passage 206 of the pole piece 178 provides a sufficient seal on the one side. An electromagnetic field that acts as a magnetic filter is produced between the armature 194 and the passages or ducts 132 or 84 on the other side. Particles that collect between them usually do not cause damage.

The spacing between the pole piece 178 and the armature 194 that corresponds to the pole gap is not influenced by the pairing of the coil-part groups 64,128 in the magnetic valves 16,17. No subsequent displacement adjustments are required, which reduces assembly costs.

Preferably no springs are used in the magnetic valves 16,17, whereby their fail-safe-behavior is decisively improved. It is possible to produce the desired pressure level at the consumer connector A by frequency modulated control of the magnetic valve 16.

The use of the described casting methods and the use of the magnetic valves 16,17 in a module 10, especially an electrohydraulic gear unit controller, allows considerable cost reductions in making the individual parts and in assembly. The magnetic valves 16,17 especially allow an economical and variably structured housing system.

The disclosure in German Patent Application 198 42 333.0-34 of Sep. 16, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a module, especially for use in a module of an electrohydraulic transmission controlling device, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A module for an electrohydraulic transmission controlling device, said module comprising a housing (12) and a plurality of magnetic valves (16,17) arranged in said housing (12), said housing (12) comprising a control block (24) and a cover (22) for the control block (24), wherein said cover (22) is made by a molded-interconnect-device casting method and said control block (24) is made by a thixotropic casting process.

2. The module as defined in claim 1, further comprising a component group (14) and wherein said cover (22) comprises a socket member (46) for connection of a controller, conductor strips (52) and devices (56,58) for electrical connection and mechanical attachment for said component group (14).

3. The module as defined in claim 2, wherein said component group (14) is arranged on a side of said cover (22) facing said control block (24).

4. The module as defined in claim 2, wherein said control block (24) is provided with receptacles (94,94,96,124) for arrangement of said component group (14) and said receptacles are arranged in a side of said cover (22) facing said control block (24).

5. The module as defined in claim 1, wherein said cover (22) includes a locking clip (40), said control block (24) is provided with a receptacle (110) and said locking clip (40) is inserted in said receptacle (110) when said cover (22) is on said control block (24).

6. The module as defined in claim 1, further comprising a switch (20) and a resistor (18) arranged in said housing (12) and wherein said switch (20) and said resistor (18) are provided on a side of said control block (24) facing away from said cover (22).

7. The module as defined in claim 6, wherein said resistor (18) has a connecting means consisting of a contact (118) for said switch (20) arranged outside of said housing (12), said resistor (18) with said connecting means consisting of a contact (118) is arranged in a receptacle (96) provided in said control block and said resistor (18) has a resilient connector (116) which has a conical covering surface that engages with a conical protruding element (56) of said cover (22).

8. The module as defined in claim 7, wherein said magnetic valves (16,17) comprise coil-part groups (64,128) and valve-part groups (138), said coil-part groups are attached to said cover (22) and said valve-part groups are attached to said control block (24).

9. The module as defined in claim 8, wherein said coil-part groups (64,128) are attached to said cover (22) by means of cut terminal connections.

10. The module as defined in claim 8, wherein said valve-part groups (138) in said control block (24) have respective pole pieces (178) and are attached in a form-locking connection in respective valve seats (94,95), each of said valve seats is provided with a plurality of passage step portions (142,144,146,148) and an edge of one(148) of said passage step portions is wedged around one of said pole pieces (178) of said valve part groups.

11. The module as defined in claim 10, wherein each of said pole pieces (178) is provided with a cylindrical depression (174), in which a punched seat disk (170) and a punched and deep-drawn valve cap (152) are arranged and said seat disk (170) and said valve cap (152) are fixed by an edge (180) in said pole piece(178).

* * * * *